W. R. DAVIS.
LATHE DOG.
APPLICATION FILED APR. 20, 1914.
1,155,553.
Patented Oct. 5, 1915.
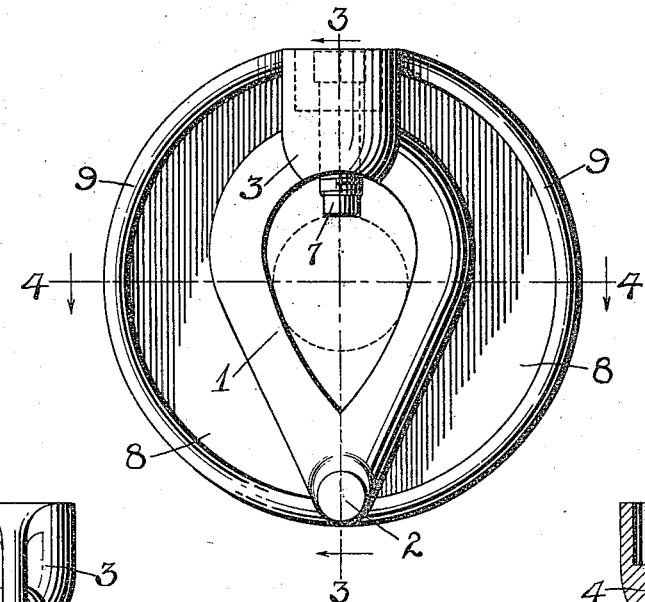
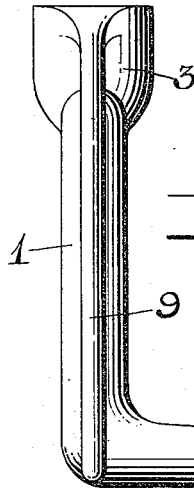
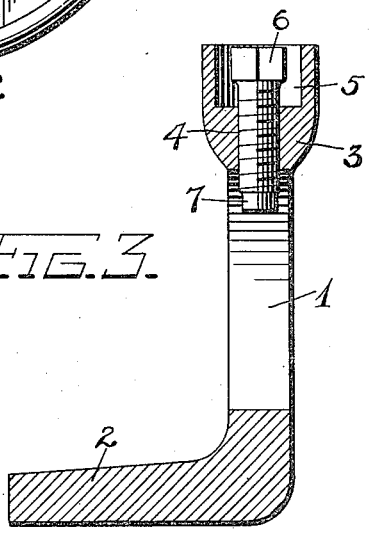
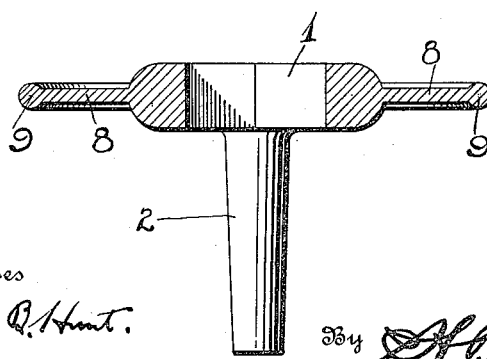
Witnesses
Edwin P. Hunt
Inventor
W. R. Davis
By H. A. Willson & Co.
Attorneys

UNITED STATES PATENT OFFICE.

WILLIAM R. DAVIS, OF TOLEDO, OHIO.

LATHE-DOG.

1,155,553.  Specification of Letters Patent.  Patented Oct. 5, 1915.

Application filed April 20, 1914. Serial No. 833,240.

*To all whom it may concern:*

Be it known that I, WILLIAM R. DAVIS, a citizen of the United States, residing at Toledo, in the county of Lucas and State of Ohio, have invented certain new and useful Improvements in Lathe-Dogs; and I do declare the following to be a full, clear, and exact description of the invention, such as will enable others skilled in the art to which it appertains to make and use the same.

My invention relates to improvements in means for clamping stock between the centers of a lathe and more particularly to the devices of this character known as lathe dogs.

It is a well known fact that with the common form of lathe dog now in every day use, the clamping screw, being exposed, is prone to catch the wearing apparel of the machinist operating the lathe thus often producing serious effects. Furthermore, the head of the screw, in this type of dog, very often becomes bent to such an extent that further use thereof is impossible. It is to overcome these undesirable features that I have provided my improved lathe dog. With this object in view, the invention resides in placing a protecting ring and bead around the dog and also providing a protecting sleeve for the screw thereof.

In the accompanying drawings in which like reference characters designate corresponding parts in all of the figures, Figure 1 is an end view of my improved lathe dog; Fig. 2 is an edge view of the device; Fig. 3 is a vertical section taken on the line 3—3 of Fig. 1; and Fig. 4 is a horizontal section on the line 4—4 thereof.

In the accompanying drawings, I have shown my invention as including a work receiving member 1 which is of substantially the shape of an ovoid, said loop carrying, at its contracted end, the usual finger or lug 2 for engagement with the slotted face plate of a lathe and carrying at its opposite end, a boss 3 which is internally threaded throughout the inner portion of its length as indicated at 4 while its outer portion is enlarged to provide a recess 5 within which the squared head 6 of a clamping screw 7 is located, the threads of said screw engaging the threads 4. With the exception of the recess 5, the parts so far described constitute the common form of lathe dog.

Coming now more particularly to one of the novel features of the invention, I provide a web 8 which projects laterally from the member 1 and is joined integrally thereto and to the boss 3. This web is of circular formation and thereby forms an uninterrupted flange around the device.

For the purpose of strengthening and protecting the outer edge of the web 8, I provide the same with a bead 9 which extends throughout the length of said web and whose ends are gradually thickened toward their juncture with the boss, whereby to provide no sharp angles which might come in contact with a tool or other object resting upon the two rails of a lathe. Since this bead 9 also lies concentrically with the arc upon which the finger 2 rotates, it will be further seen that, if the dog be employed on a lathe having a six inch swing, and if said dog be six inches in length from its center to its finger 2, this finger as well as the bead 9 will project downwardly between the parallel bed rails of the lathe, thereby preventing a tool from being shifted longitudinally upon said rails to a point at which it might be struck by the finger.

As clearly shown in the drawings, the head of the screw 7 is entirely protected against injury, this provision also protecting the machinist operating the lathe. It will therefore be seen that I have produced an extremely simple lathe dog yet one which will be equally well adapted to its work as are the forms now in use and which possesses numerous advantageous features.

Having thus described my invention, what I claim as new and desire to secure by Letters Patent is:—

The combination with a lathe dog comprising a work clamping yoke, a finger projecting laterally from one side thereof and lying substantially parallel to the axis of the yoke, and a clamping screw passing through one side of said yoke and having a head projecting outwardly therefrom; of a circular guard flange surrounding said yoke and terminating on opposite sides of the head of said screw and on opposite sides of said finger, whereby to protect both the screw and the finger, the outer edge of the flange being formed on an arc described around the axis of the yoke.

In testimony whereof I have hereunto set my hand in presence of two subscribing witnesses.

WILLIAM R. DAVIS.

Witnesses:
PHILIP J. JACOB,
P. J. DOLAN.

Copies of this patent may be obtained for five cents each, by addressing the "Commissioner of Patents, Washington, D. C."